United States Patent
Baumgartner et al.

(10) Patent No.: US 7,884,514 B2
(45) Date of Patent: Feb. 8, 2011

(54) STATOR FOR A MULTIPHASE ELECTRIC MOTOR

(75) Inventors: Joachim Baumgartner, Volkach (DE); Tobias Buban, Gerbrunn (DE)

(73) Assignees: Brose Fahrzeugteile GmbH & Co., Wuerzburg (DE); Kommanditgesellschaft, Wuerzburg ( * ) Notice: Subject to any disclaimer, the term of this patent is extended or adjusted under 35 U.S.C. 154(b) by 0 days.

(21) Appl. No.: 12/238,723

(22) Filed: Sep. 26, 2008

(65) Prior Publication Data
US 2009/0015092 A1    Jan. 15, 2009

Related U.S. Application Data

(62) Division of application No. 11/382,155, filed on May 8, 2006, now Pat. No. 7,430,796.

(30) Foreign Application Priority Data

May 11, 2005    (EP) .................................. 05010261

(51) Int. Cl.
H02K 11/00    (2006.01)
(52) U.S. Cl. ........................ 310/71; 310/203
(58) Field of Classification Search .................. 310/71, 310/203
See application file for complete search history.

(56) References Cited

U.S. PATENT DOCUMENTS

| | | | | |
|---|---|---|---|---|
| 3,984,712 A | * | 10/1976 | Hill | 310/71 |
| 4,698,533 A | * | 10/1987 | Kindig et al. | 310/71 |
| 5,175,458 A | * | 12/1992 | Lemmer et al. | 310/71 |
| 5,194,775 A | | 3/1993 | Cooper | 310/260 |
| 5,204,566 A | * | 4/1993 | Borgen et al. | 310/71 |
| 5,810,278 A | | 9/1998 | Ruoss | 242/432.5 |
| 6,471,155 B2 | | 10/2002 | Haruta et al. | 242/433.3 |
| 6,749,144 B2 | | 6/2004 | Komuro et al. | 242/432.5 |
| 6,800,973 B2 | * | 10/2004 | Futami et al. | 310/71 |
| 2002/0017585 A1 | | 2/2002 | Haruta et al. | 242/433.3 |
| 2003/0020344 A1 | * | 1/2003 | Futami et al. | 310/71 |
| 2003/0102765 A1 | | 6/2003 | Knoll et al. | 310/218 |
| 2003/0173842 A1 | * | 9/2003 | Kobayashi et al. | 310/71 |

(Continued)

FOREIGN PATENT DOCUMENTS

DE    10045471 A1    4/2002

(Continued)

OTHER PUBLICATIONS

Search Report and Written Opinion; EP05010261; p. 7, Oct. 2005.

(Continued)

*Primary Examiner*—Quyen Leung
*Assistant Examiner*—Alex W Mok
(74) *Attorney, Agent, or Firm*—Westman, Champlin & Kelly, P.A.

(57) ABSTRACT

In a method for winding the stator of a multiphase electric motor a plurality of mutually spaced stator teeth are assigned to each phase, wherein all the teeth of the stator are wound without a break in the winding wire, and wherein the winding wire is taken via a contact-making element of a contact-making device before or after the winding of all the stator teeth assigned to a phase.

14 Claims, 4 Drawing Sheets

U.S. PATENT DOCUMENTS

| | | | |
|---|---|---|---|
| 2004/0056552 A1* | 3/2004 | Miya et al. | 310/216 |
| 2004/0119350 A1* | 6/2004 | Miya et al. | 310/71 |
| 2004/0150275 A1* | 8/2004 | Koyama et al. | 310/71 |
| 2004/0183388 A1 | 9/2004 | Rittmeyer | 310/179 |
| 2004/0232785 A1* | 11/2004 | Yamada et al. | 310/71 |

FOREIGN PATENT DOCUMENTS

| | | |
|---|---|---|
| DE | 10213743 A1 | 10/2003 |
| DE | 10337916 A1 | 3/2005 |
| EP | 11916665 B1 | 8/2001 |
| EP | 1191665 | 3/2002 |
| EP | 1490949 B1 | 2/2003 |
| WO | WO 2004/008609 | 1/2004 |

OTHER PUBLICATIONS

First Office Action of the corresponding European patent application No. 05010261.5-2207 date Feb. 4, 2010, 3 pages.

First Office Action of the co-pending Chinese patent application (official file No. 200610079849.8); date of issue Dec. 18, 2009; 3 pages.

* cited by examiner

STATOR FOR A MULTIPHASE ELECTRIC MOTOR

PRIORITY

This application is a Divisional of U.S. application Ser. No. 11/382,155, filed on May 8, 2006 now U.S. Pat. No. 7,430,796, which claims priority from European Patent Application No. EP05010261.5, which was filed on May 11, 2005. The contents of these applications are incorporated herein in their entirety by the reference.

TECHNICAL FIELD

The invention relates to a method for winding the stator of an electric motor and to a stator for an electric motor.

BACKGROUND

It is already known to implement the stator winding of a brushless electric motor in the sense of a delta connection. When winding the teeth of the stator, the wire is severed at each new tooth winding and connected up electrically using an additional component, for example a leadframe, a connector or a wiring harness.

A stator for electric motors is known from DE 100 45 471 A1, wherein a stator winding comprising a plurality of phase windings is pulled into the stator slot of a stator core. Both ends of the wires of the individual phase windings which emanate from the slot are fed directly to at least one contact-making device attached to the stator core and are connected to this. All connecting ends of the phase windings emanate from the stator slot at the slot base. Also arranged on the stator is a wiring carrier which is provided for guiding the connecting ends without contact to the contact-making device(s). In the manufacture of the known motor, the individual phase windings are initially wound on formers. Then, after removal of the formers, the ready-wound coils are jointly pulled into the insulating slots of the stator core. After this pulling-in, a hook is used to position the connecting ends manually in the slot base. After taking the ends into a laying aid, both ends of the wires are taken by machine to a contact-making device in which both ends of the wires are electrically connected by means of insulation displacement technology to external motor terminals or the phase windings are connected up internally.

A method specifying a procedure for winding the stator of a multiphase electric motor is already known from US 2004/0183388, in which a plurality of mutually spaced stator teeth are assigned to each phase, wherein all the teeth of the stator are wound without a break in the winding wire, and wherein the winding wire is taken via a contact-making element of a contact-making device before or after the winding of the stator teeth assigned to a phase.

A stator for an electric motor is known from DE 102 13 743 A1 that comprises a stator lamination having a number of stator slots and stator teeth for accommodating stator windings, plus a wiring arrangement for connecting up winding wires of the stator windings. The stator windings wound around the stator teeth through the stator slots project with a winding head on both end faces of the stator lamination. The wiring arrangement comprises winding contact elements and wiring contact elements. At least the wiring contact elements are arranged on one end face of the stator lamination, substantially inside an area bounded by the stator windings and a plane defined by the winding head, the winding contact elements being assigned to the stator teeth/stator slots as stator-fixed winding support points in such a way that the stator windings can be wound onto the stator teeth in a continuous winding process, and in each case with the winding wires passing over the winding contact elements. Each wiring contact element makes an electrical connection to the winding contact elements of a specific group in the process.

In addition, an electric motor is known from US 2003/0102765 A1, in which all the windings of the stator are applied in a single continuous winding process. The start and end point of the winding wire are brought together at the same contact point.

SUMMARY

The object of the invention is to simplify the process of winding a stator.

This object can be achieved by 1. A method for winding the stator of a multiphase electric motor, in which a plurality of mutually spaced stator teeth are assigned to each phase, the method comprising the steps of winding all the teeth of the stator without a break in the winding wire, and taking the winding wire via a contact-making element of a contact-making device before or after the winding of all the stator teeth assigned to a phase, wherein said contact-making element is arranged outside the stator core in a radial direction.

The method may further comprise the following steps of taking the winding wire via a first contact-making element of a contact-making device, taking the winding wire via the stator teeth assigned to the first phase, these stator teeth being wound around individually and successively by the winding wire, taking the winding wire via a second contact-making element of the contact-making device, said second contact-making element being electrically insulated from the first contact-making element, taking the winding wire via the stator teeth assigned to the second phase, these stator teeth being wound around individually and successively by the winding wire, taking the winding wire via a third contact-making element of the contact-making device, said third contact-making element being electrically insulated from the first and second contact-making element, and taking the winding wire via the stator teeth assigned to the third phase, these stator teeth being wound around individually and successively by the winding wire.

The object can also be achieved by a stator for a multiphase electric motor, comprising a stator core, a multiplicity of stator teeth, each phase being assigned a plurality of mutually spaced stator teeth, wherein all the teeth of the stator are wound by a winding wire without a break in it, the winding wire is taken via a contact-making element before or after the winding of all the stator teeth assigned to a phase, and the contact-making element is arranged outside the stator core in a radial direction.

The contact-making elements can be components of a contact-making device which is used to make electrical contact between the stator winding and external mating contacts. The stator core may have a substantially circular cross-section. The stator may comprise an insulating disc positioned on the upper side of the stator core, and the contact-making device and the insulating disc may form a single-piece plastic molded part. The contact-making elements can be hooks made of an electrically conducting material. The hooks can be each connected via an electrical conductor to a terminal for an external mating contact. The contact-making elements of the contact-making device can be used for electrically connecting the phases internally. The insulating disc may comprise teeth turned vertically upward, and the winding wire can be taken through the spaces between the teeth.

The advantages of the invention consist particularly in that when winding the teeth of a stator the winding wire can be taken around all the teeth of the stator in a single operation without a repeated severance. There is no need for additional components to be used for re-connecting severed wire sections to each other.

The internal and external electrical contacts to the individual phases are made using contact-making elements that are components of a contact-making device arranged outside the stator core. These contact-making elements are preferably electrically conducting hooks, around which the winding wire is laid during the winding process. The electrical contact to the conductive core of the winding wire by the respective hook is made after the whole winding process is complete, for example by welding, in which the sheathing of the winding wire is melted.

Each of the hooks is preferably connected via a conducting track to a contact element for a mating contact, for example for a mating connector.

The hooks, tracks and contact elements are preferably arranged on a plastic carrier, which together with the insulating disc of the stator forms a single-piece plastic molded part.

The insulating disc comprises teeth turned vertically upward, with the winding wire taken through the spaces between them, thereby making separate deflecting elements on the insulating disc unnecessary.

BRIEF DESCRIPTION OF THE DRAWINGS

Further advantageous embodiments of the invention follow from their explanation by way of example with reference to the figures, in which.

DETAILED DESCRIPTION

A method for winding the stator of an electric motor and a stator for an electric motor are the subjects of the invention. This electric motor is, for example, a three-phase electric motor having a total of three phase windings.

Figure 1:
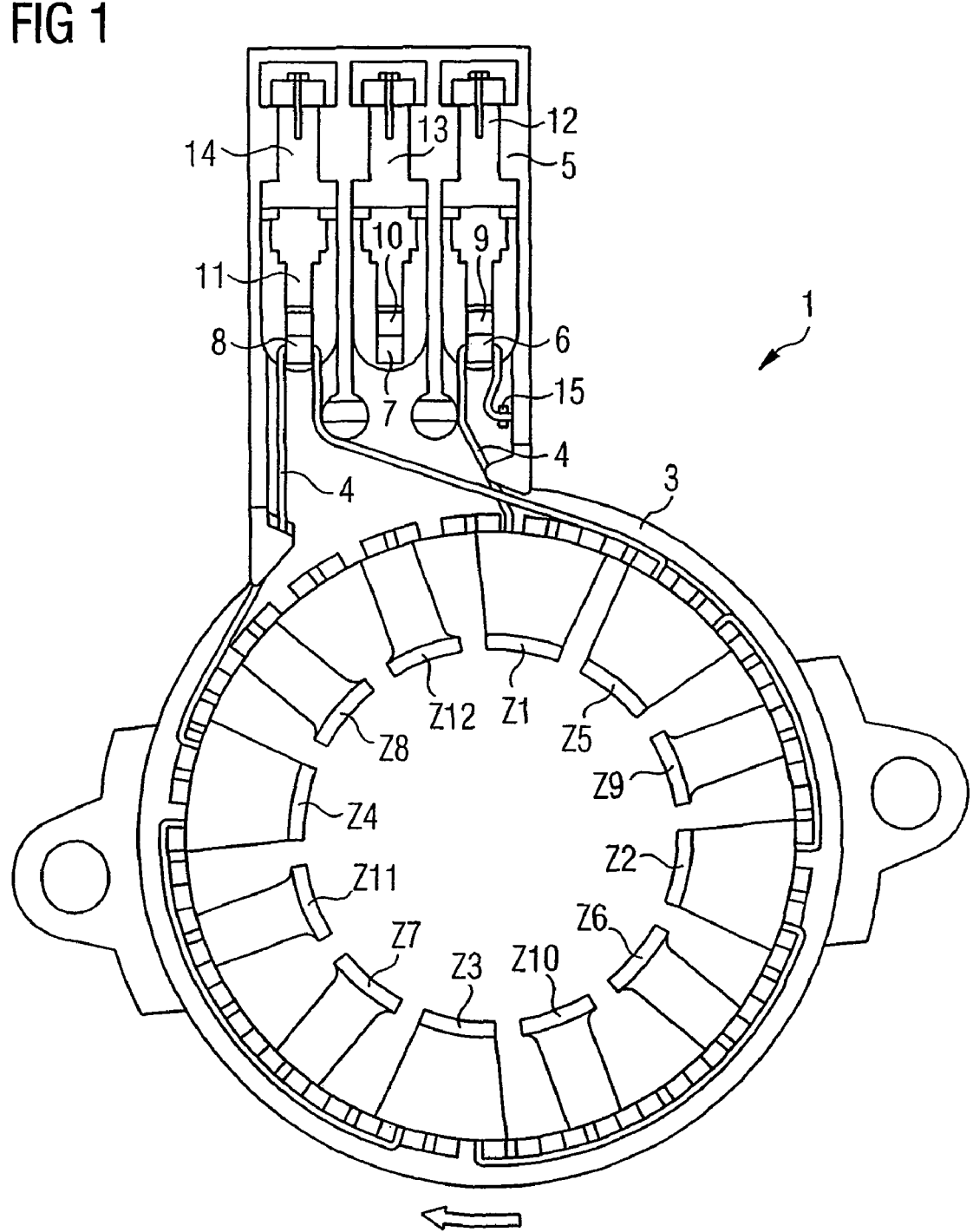
FIG. 1 shows a plan view of a stator in the partially wound state.

To illustrate the invention, FIG. 1 shows first a plan view of a stator 1 in the partially wound state. A stator 1 according to the invention comprises a stator core, having an insulating disc 3 arranged on its upper side. The stator core has a substantially circular cross-section. The insulating disc 3 together with a contact-making device 5 forms a single-piece plastic molded part. The contact-making device 5 is arranged outside the stator core in a radial direction. In addition, the stator is provided with teeth Z1, . . . , Z12, which extend inward from the stator core, leaving open a cylindrical inner area, inside of which the rotor (not shown) of the motor rotates during operation.

Electrically conducting contact elements 6, 7 and 8 in the form of metal hooks are attached to the contact-making device 5. These hooks 6, 7 and 8 are electrically insulated from each other and are each connected via an electrical track 9, 10, 11 to a terminal 12, 13, 14 for a mating contact. The stator shown can be connected to a mating connector (not shown) via these terminals 12, 13, 14.

In the exemplary embodiment shown, it is assumed that a three-phase electric motor is to be implemented for which the three phase windings of the stator winding are in the form of a delta connection, where the teeth Z1, Z2, Z3 and Z4 are assigned to the first phase, the teeth Z5, Z6, Z7 and Z8 to the second phase, and the teeth Z9, Z10, Z11 and Z12 to the third phase.

FIG. 1 shows the stator in the partially wound state, in which the teeth Z1, Z2, Z3 and Z4 belonging to the first phase and the tooth Z5 belonging to the second phase are wound. The other teeth Z6 to Z12 are not wound yet.

The winding of the stator performed so far is achieved as follows:

First, one end of the winding wire 4, comprising an electrically non-conducting sheath and an electrically conducting core, is optionally fastened to a fastening element 15 that is part of the contact-making device 5 or attached to this, or held in the device.

Then the winding wire 4 is laid around the contact-making element 6, which is an electrically conducting metal hook.

From here the winding wire 4 is taken between two teeth standing upright on the insulating disc 3 through to the stator tooth Z1 and wound onto this. Once the stator tooth Z1 has been wound, the winding wire 4 is taken to the outside through two further teeth standing upright on the insulating disc 3, bent around and taken on the outer side of the teeth standing upright on the insulating disc 3 into the area of the stator tooth Z2, which is also assigned to the first phase.

Here the winding wire 4 is again taken between two of the teeth standing upright on the insulating disc 3 through to the stator tooth Z2 and wound onto this. Once the stator tooth Z2 has been wound, the winding wire 4 is taken to the outside through two further teeth standing upright on the insulating disc 3, bent around and taken on the outer side of the teeth standing upright on the insulating disc 3 into the area of the stator tooth Z3, which also belongs to the first phase.

Here the winding wire 4 is again taken between two of the teeth standing upright on the insulating disc 3 through to the stator tooth Z3 and wound onto this. Once the stator tooth Z3 has been wound, the winding wire 4 is taken to the outside again through two further teeth standing upright on the insulating disc 3, bent around and taken on the outer side of the teeth standing upright on the insulating disc 3 into the area of the stator tooth Z4, which also belongs to the first phase.

Here the winding wire 4 is again taken between two of the teeth standing upright on the insulating disc 3 through to the stator tooth Z4 and wound onto this. Once the stator tooth Z4 has been wound, the winding wire 4 is taken to the outside again through two further teeth standing upright on the insulating disc 3, thereby completing the first phase winding.

Then the winding wire 4 is taken without a break in it to the contact-making element 8, which again is an electrically conducting metal hook, and laid around this.

From here, the winding wire 4 is taken on the outer side of the teeth standing upright on the insulating disc 3 up to the area of the stator tooth Z5, which belongs to the second phase. Here the winding wire 4 is taken between two of the teeth standing upright on the insulating disc through to the stator tooth Z5 and wound onto this. Once the stator tooth Z5 has been wound, the winding wire 4 is taken to the outside through two further teeth standing upright on the insulating disc, bent around and taken on the outer side of the teeth standing upright on the insulating disc up into the area of the stator tooth Z6.

The winding of the other stator teeth Z6, Z7 and Z8 of the second phase and the subsequent winding of the stator teeth Z9, Z10, Z11 and Z12, which FIG. 1 does not show, is then produced in the same way as the winding of the stator teeth Z1-Z5. It should be noted here, however, that after producing the second phase winding, the winding wire is taken from the stator tooth Z8 via the contact-making element 7 implemented in the form of an electrically conducting metal hook, laid around this, and is then taken along the outer side of the teeth standing upright on the insulating disc 3 into the area of the stator tooth Z9, which is assigned to the third phase. In addition, after producing the third phase winding, the winding wire must be taken back again from the stator tooth Z12 to the first contact-making element 6 and fastened there.

In the exemplary embodiment described above, one end of the winding wire 4 is hence fastened to a fastening element 15 that is provided on a contact-making device 5, or held in the device. Then the winding wire is taken via a first contact-making element 6 of the contact-making device 5. Then the winding wire 4 is taken via the stator teeth Z1, Z2, Z3 and Z4 assigned to the first phase, these stator teeth being wound around individually and successively by the winding wire 4. Afterwards, the winding wire 4 is taken via a second contact-making element 8 of the contact-making device 5, said second contact-making element being electrically insulated from the first contact-making element 6. Then the winding wire 4 is taken via the stator teeth Z5, Z6, Z7 and Z8 assigned to the second phase, these stator teeth being wound around individually and successively by the winding wire 4. Subsequently, the winding wire 4 is taken via a third contact-making element 7 of the contact-making device 5, said third contact-making element being electrically insulated from the first and second contact element 6 and 8 respectively. Then the winding wire 4 is taken via the stator teeth Z9, Z10, Z11 and Z12 assigned to the third phase, these stator teeth also being wound around individually and successively by the winding wire 4. The winding wire 4 is taken back from the stator tooth Z12 to the contact-making element 6.

Once all the teeth of the stator have been wound according to the procedure described above, electrical contact between the phase windings is made by electrically connecting the winding wire laid around the metal hooks 6, 7 and 8 to the respective hook by a welding process, in order to produce the required delta connection of the phase windings.

The external electrical contact to this delta connection is made via the respective track 9, 10, 11 and the respective terminal 12, 13, 14 for a mating contact.

Figure 2:
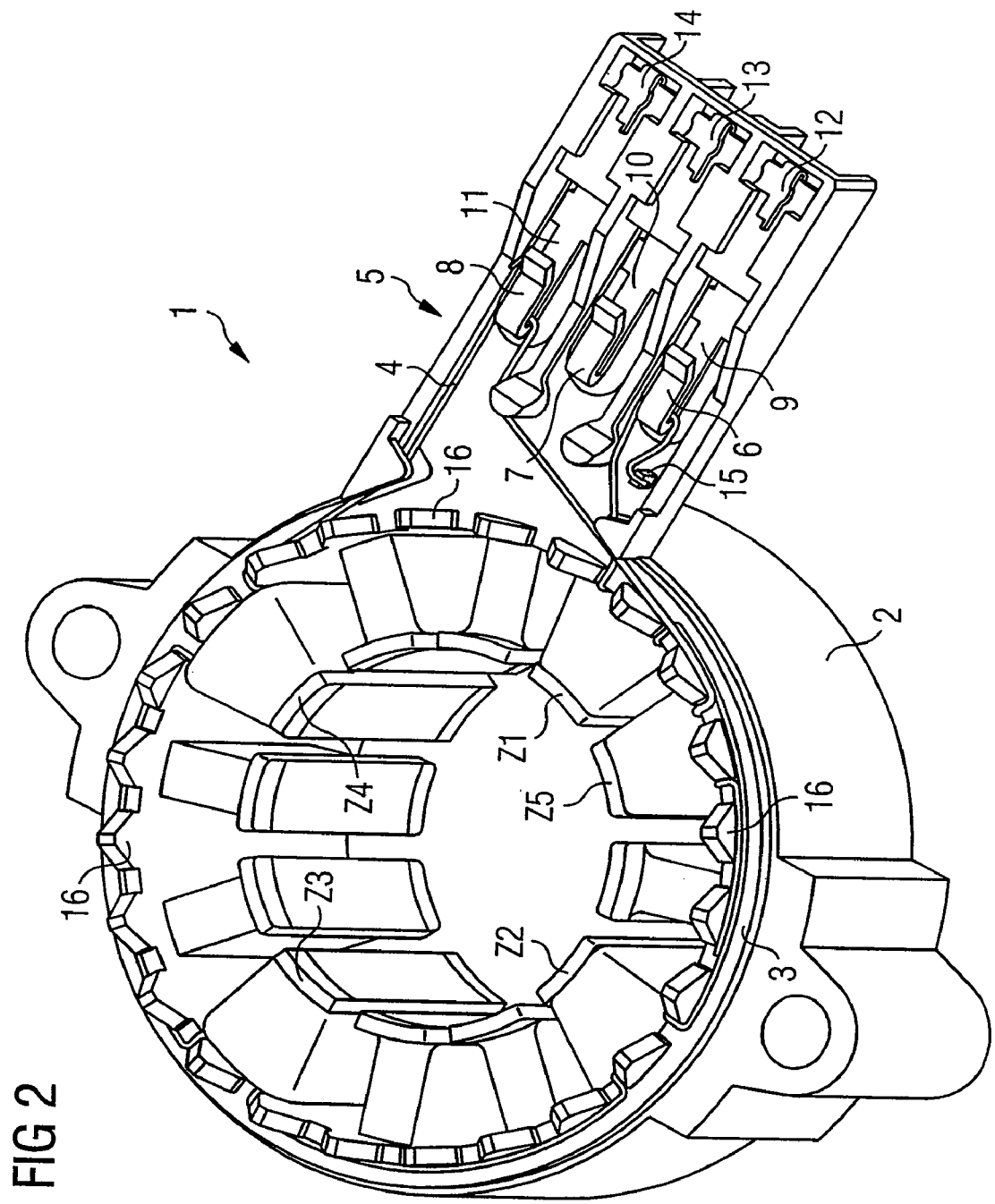
FIG. 2 shows a perspective sketch for illustrating the stator shown in FIG. 1.

FIG. 2 shows a perspective drawing of the stator shown in FIG. 1 to illustrate the invention further. In FIG. 2, some of the teeth standing upright on the insulating disc 3, between which the winding wire 4 is taken through for winding the stator teeth, are labeled with the reference number 16. In addition, FIG. 2 shows more clearly that the insulating disc 3 is positioned on the upper side of the stator core 2. Furthermore, it is clear from FIG. 2 that the contact-making device 5 and the insulating disc 3 are made in the form of a single-piece plastic molded part, and that the contact-making device 5 serves as a carrier for the hooks 6, 7, 8, the tracks 9, 10, 11 and the terminals 12, 13, 14 for a mating contact.

An alternative embodiment of the invention not shown in the figures consists in fastening the winding wire 4 first to the fastening element 15, then taking it from there directly to the stator teeth assigned to the first phase for winding around them successively, then taking it via a first contact-making element of the contact-making device, taking it from there to the stator teeth assigned to the second phase for winding around them successively, then taking it via a second contact-making element of the contact-making device, taking it from there to the stator teeth assigned to the third phase for winding around them successively, and then taking it via a third contact-making element of the contact-making device.

Figure 3:
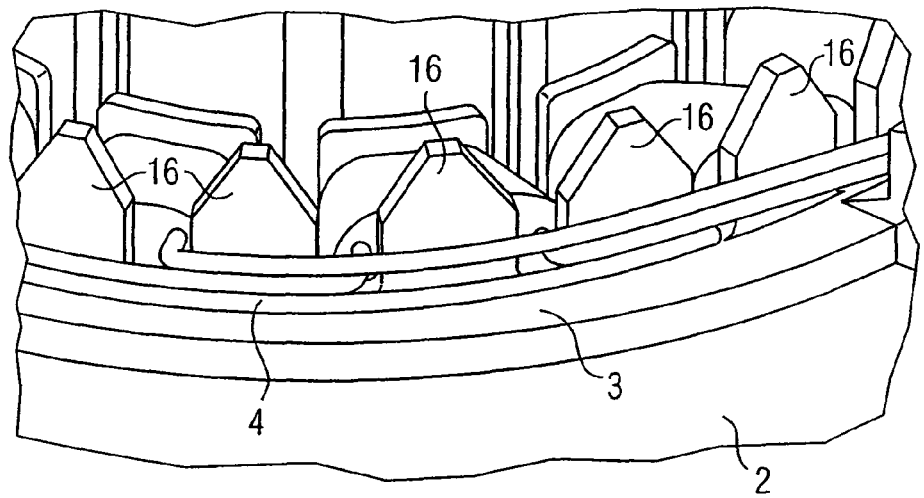
FIG. 3 shows a detailed view of a sub-section of the stator in the fully wound state.

FIG. 3 shows a detailed diagram of a sub-section of the stator in the fully wound state. This diagram shows in particular that the winding wire 4 for winding a stator tooth is taken through an inter-tooth space between two adjacent teeth 16 to the respective stator tooth, and after being wound on the stator tooth, is taken to the outside again through another or alternatively even the same inter-tooth space, bent around and taken along the outer side of the teeth into the area of the next stator tooth of the same phase. FIG. 3 also shows that the winding wire 4 is positioned on top of itself on the outer sides of the teeth 16 standing upright from the insulating disc 3, and comprises layers lying immediately against each other, the lowest layer of the winding wire being formed in the first winding pass, the center layer by the winding wire in the second winding pass and the top layer of the winding wire in the third winding pass.

Figure 4:
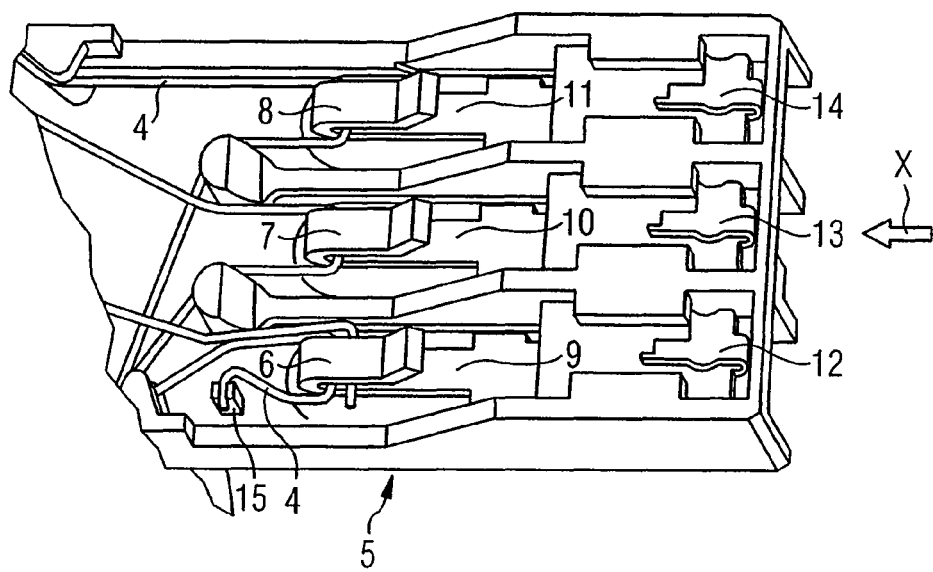
FIG. 4 shows an enlarged view of the contact-making device 5 of the stator.

FIG. 4 shows an enlarged view of the contact-making device 5 of the stator. In this diagram it is clearly visible that the contact-making device is a plastic molded part comprising recesses running parallel to each other. The hook 6 connected via a track 9 to the terminal 12 for a mating contact is inserted in the lower recess 4 shown in FIG. 4. The hook 7 connected via a track 10 to the terminal 13 for a mating contact is inserted in the center recess shown in FIG. 4. The hook 8 connected via a track 11 to the terminal 14 for a mating contact is inserted in the top recess shown in FIG. 4.

The hook 6, the track 9 and the terminal 12 can be implemented in the form of a single-piece component having a continuous electrically conducting path that is needed to make electrical contact with a mating connector introduced into the contact-making device 5 in direction x. The hook 7, the track and the terminal 13 can also be implemented in the form of a single-piece component. The same applies to the hook 8, the track 11 and the terminal 14.

Figure 5:
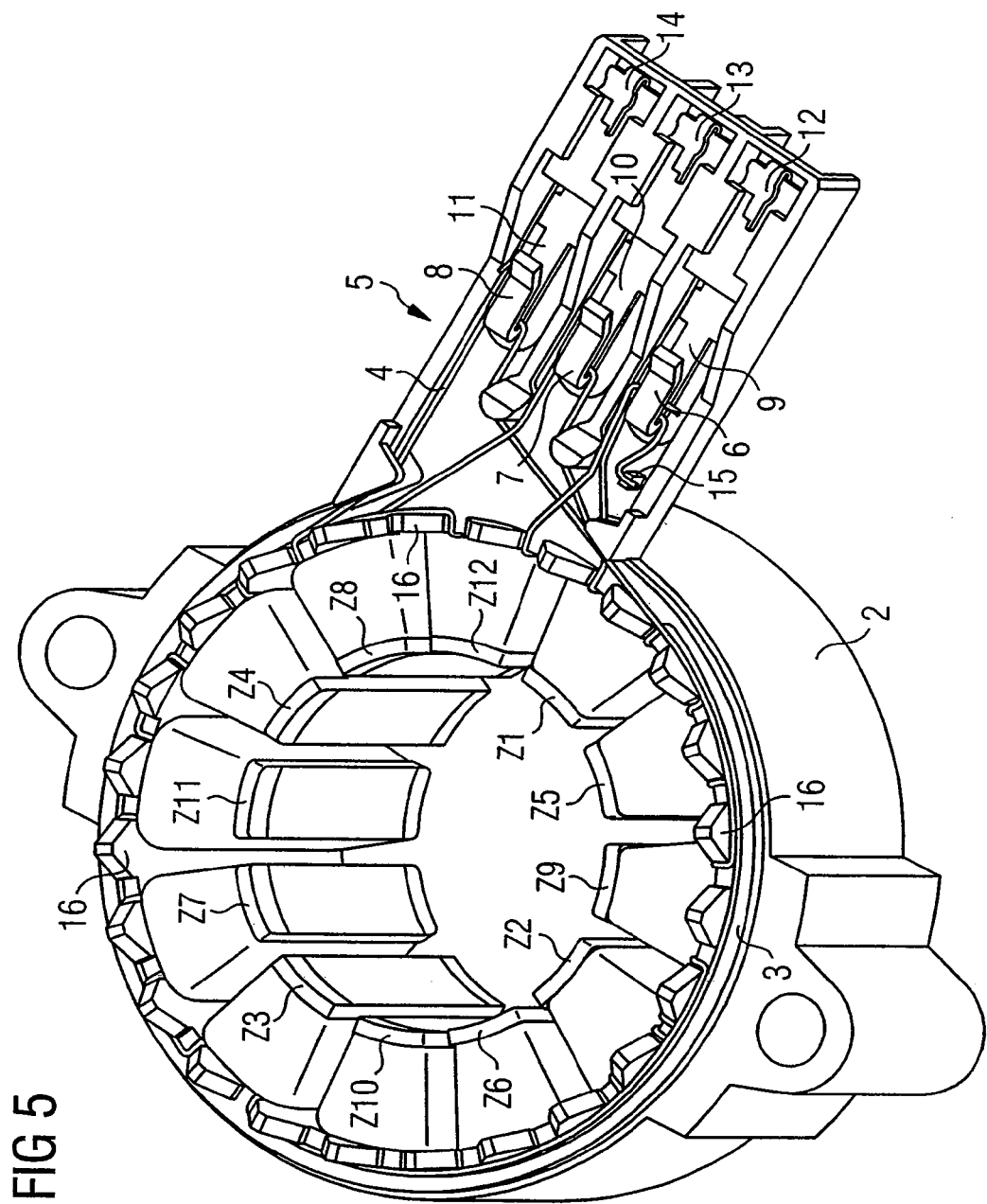
FIG. 5 shows a perspective drawing for illustrating the stator in the fully wound state.

FIG. 5 shows a perspective drawing for illustrating the stator in the fully wound state, in which the winding wire has been wound around all the teeth Z1-Z12. This drawing shows particularly clearly that the winding wire 4 is taken to the center hook 7 after winding around the tooth Z8, taken around said hook and then bent around again toward the tooth Z9. In addition, FIG. 5 shows that after producing all the phase windings, the winding wire 4 is taken back again from the stator tooth Z12 to the hook 6.

What is claimed is:
1. A stator for a multiphase electric motor, comprising:
a stator core,
a multiplicity of stator teeth, each phase being assigned a plurality of mutually spaced stator teeth,
an insulating disc positioned on the upper side of the stator core,
wherein
all the teeth of the stator are wound by a winding wire without a break in it,
the winding wire is taken via a contact-making element before or after the winding of all the stator teeth assigned to a phase, and
the contact-making element is arranged outside the stator core and the insulated disc in a radial direction.
2. A stator according to claim 1, wherein the contact-making elements are components of a contact-making device which is used to make electrical contact between the stator winding and external mating contacts.

3. A stator according to claim 2, wherein the stator core has a substantially circular cross-section.

4. A stator according to claim 2, wherein the contact-making device and the insulating disc form a single-piece plastic molded part.

5. A stator according to claim 1, wherein the contact-making elements are hooks made of an electrically conducting material.

6. A stator according to claim 5, wherein the hooks are each connected via an electrical conductor to a terminal for an external mating contact.

7. A stator according to claim 1, wherein the contact-making elements of the contact-making device are used for electrically connecting the phases internally.

8. A stator according to claim 1, wherein the insulating disc comprises teeth turned vertically upward, and the winding wire is taken through the spaces between the teeth.

9. A stator for a multiphase electric motor, comprising:
a stator core,
a multiplicity of stator teeth, each phase being assigned a plurality of mutually spaced stator teeth,
an insulating disc positioned on the upper side of the stator core,
wherein
all the teeth of the stator are wound by a winding wire without a break in it,
the winding wire is taken via a contact-making element before or after the winding of all the stator teeth assigned to a phase,
the contact-making element is arranged outside the stator core and the insulating disc in a radial direction,
the contact-making elements are components of a contact-making device which is used to make electrical contact between the stator winding and external mating contacts, and
the stator core has a substantially circular cross-section.

10. A stator according to claim 9, wherein the contact-making device and the insulating disc form a single-piece plastic molded part.

11. A stator according to claim 9, wherein the contact-making elements are hooks made of an electrically conducting material.

12. A stator according to claim 11, wherein the hooks are each connected via an electrical conductor to a terminal for an external mating contact.

13. A stator according to claim 9, wherein the contact-making elements of the contact-making device are used for electrically connecting the phases internally.

14. A stator according to claim 9, wherein the insulating disc comprises teeth turned vertically upward, and the winding wire is taken through the spaces between the teeth.

* * * * *